United States Patent
Kretschmann et al.

(10) Patent No.: US 11,124,026 B2
(45) Date of Patent: Sep. 21, 2021

(54) METHOD, CONTROL DEVICE AND SYSTEM FOR ASCERTAINING TREAD DEPTHS OF TIRES ON VEHICLES

(71) Applicant: Continental Automotive GmbH, Hannover (DE)

(72) Inventors: Matthias Kretschmann, Wenzenbach (DE); Shichao You, Regensburg (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 108 days.

(21) Appl. No.: 16/715,515

(22) Filed: Dec. 16, 2019

(65) Prior Publication Data

US 2020/0189328 A1 Jun. 18, 2020

(30) Foreign Application Priority Data

Dec. 17, 2018 (DE) .................... 10 2018 221 981.8

(51) Int. Cl.
*G01M 17/02* (2006.01)
*B60C 11/24* (2006.01)
(Continued)

(52) U.S. Cl.
CPC ........... *B60C 11/246* (2013.01); *G01M 17/02* (2013.01); *B60C 11/243* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 5,789,668 A | * | 8/1998 | Coe ........................ G01B 21/20 73/146 |
| 8,794,058 B2 | | 8/2014 | Bigot et al. |

(Continued)

FOREIGN PATENT DOCUMENTS

| DE | 102009006458 A1 | 8/2010 |
| DE | 102012217901 B3 | 5/2014 |

(Continued)

OTHER PUBLICATIONS

German Examination Report for German Application No. 10 2018 221 981.8, with partial translation, dated Oct. 23, 2019, 6 pages.

*Primary Examiner* — Andre J Allen
(74) *Attorney, Agent, or Firm* — RatnerPrestia

(57) ABSTRACT

Thread depth ascertainment for vehicle tires involves a plurality of vehicles transmitting respective adaptation data to a central data processor. The data processing device forming optimization data on the basis thereof and transmitting the optimization data to the vehicles. The adaptation data are formed by the vehicles based on tire type, mileage and rotation speed of the tire and a velocity of the vehicle and at least one operating parameter of the tire, and the optimization data are used by each of the vehicles for ascertaining the tread depth of a relevant tire based on model of the ascertained tire type, wherein the model supplies the tread depth based on the rotation speed of the tire, the velocity of the vehicle and at least one operating parameter of the tire using at least one model parameter, which is determined based on the optimization data received from the central data processor.

12 Claims, 4 Drawing Sheets

(51) Int. Cl.
*B60C 19/00* (2006.01)
*B60C 23/04* (2006.01)
*B60C 23/06* (2006.01)

(52) U.S. Cl.
CPC ........ *B60C 23/0408* (2013.01); *B60C 23/061* (2013.01); *B60C 2019/004* (2013.01); *B60W 2530/20* (2013.01)

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 9,669,664 B2 | 6/2017 | Kretschmann | |
| 2019/0270347 A1* | 9/2019 | Stewart | B60C 11/246 |
| 2020/0062042 A1* | 2/2020 | Pryce | G01B 11/026 |

FOREIGN PATENT DOCUMENTS

| | | |
|---|---|---|
| DE | 102017204648 A1 | 9/2018 |
| EP | 3378679 A1 | 9/2018 |

* cited by examiner

METHOD, CONTROL DEVICE AND SYSTEM FOR ASCERTAINING TREAD DEPTHS OF TIRES ON VEHICLES

CROSS REFERENCE TO RELATED APPLICATIONS

This application claims priority to German Patent Application No. 10 2018 221 981.8, filed Dec. 17, 2018, the contents of such application being incorporated by reference herein.

FIELD OF THE INVENTION

The present invention relates to a method and a control device for ascertaining a tread depth of a tire during operation of a vehicle having the tire. The invention further relates to a system for ascertaining tread depths of tires on a plurality of vehicles.

BACKGROUND OF THE INVENTION

A method for ascertaining a tread depth of a tire during operation of a vehicle having the tire is known from DE 10 2012 217 901 B3, incorporated herein by reference. The method has the following steps:
  ascertaining a rotation speed of a wheel of the vehicle that has the tire,
  ascertaining a velocity of the vehicle,
  ascertaining a dynamic wheel radius of the wheel having the tire on the basis of the ascertained rotation speed and the ascertained velocity,
  ascertaining at least one operating parameter of the tire, selected from the parameters tire temperature, tire pressure and tire load,
  ascertaining an inside radius of the wheel on the basis of the at least one ascertained operating parameter, wherein the inside radius of the wheel is the distance between the wheel center and the tire-side start of the tread,
  ascertaining a tread depth of the tire on the basis of the ascertained dynamic wheel radius and the ascertained dynamic inside radius.

Regarding the latter step of this method, it is proposed in particular that the tread depth be determined as the difference between the dynamic wheel radius and the dynamic inside radius.

A development of this method is described in DE 10 2017 204 648 A1, incorporated herein by reference, and takes account of the circumstance that, in practice, the tread depth of a tire is considered to be the difference between a geometric wheel radius and a geometric inside radius, that is to say the radii that are independent of tire operation on a vehicle and that are measured on a tire (e.g. removed from the vehicle) as such. The dynamic radii (dynamic wheel radius and dynamic inside radius) during operation of the tire can differ therefrom, however, so that the determination of the tread depth as a difference between the dynamic and non-geometric radii is typically only an approximation.

Against this background, DE 10 2017 204 648 A1 proposes that the tread depth be ascertained by additionally taking into consideration a correction variable ascertained beforehand for the type of tire, wherein the correction variable characterizes the relationship between a change in the tread depth, on the one hand, and a change resulting therefrom in the difference between the dynamic wheel radius and the dynamic inside radius, on the other hand. By taking into consideration such a correction variable dependent at least on the type of tire, e.g. a correction function or correction constant, the tread depth can advantageously be ascertained with improved accuracy.

One problem, however, is that there are numerous different tire types in practice, which means that it is a comparatively great effort to ascertain the suitable at least one correction variable for each tire type, or in other words to stipulate for each tire type an appropriate (mathematical) model that takes the rotation speed of the tire, the velocity of the vehicle and the at least one operating parameter, as input variables for the model, as a basis for supplying the tread depth, as an output variable for the model.

SUMMARY OF THE INVENTION

Therefore an aspect of the present invention aims to allow tread depth to be ascertained on tires of vehicles with comparatively little effort and nevertheless high accuracy.

In accordance with a first aspect of the present invention, this is achieved by a method for ascertaining a tread depth of a tire during operation of a vehicle having the tire, wherein the method has the following steps:
  ascertaining a tire type of the tire and a mileage of the tire,
  ascertaining a rotation speed of the tire, a velocity of the vehicle and at least one operating parameter selected from the group consisting of a tire pressure, a tire temperature and a tire load of the tire,
  in the case of a tire up to a predetermined maximum mileage: transmitting adaptation data, formed on the basis of the tire type of the tire, the mileage of the tire, the rotation speed of the tire, the velocity of the vehicle and the at least one operating parameter of the tire, to a central data processing device,
  in the case of a tire upward of a predetermined minimum mileage: receiving optimization data for the ascertained tire type from the central data processing device, ascertaining the tread depth of the tire on the basis of a model, containing at least one model parameter, of the ascertained tire type, wherein the model supplies the tread depth on the basis of the rotation speed of the tire, the velocity of the vehicle and the at least one operating parameter of the tire, using the at least one model parameter, which is determined on the basis of the optimization data received from the central data processing device,
  wherein a plurality of vehicles transmit respective adaptation data to the central data processing device, and the central data processing device forms the optimization data on the basis thereof.

There is therefore provision for ascertaining the tread depth of the tire on the basis of a model, containing at least one model parameter, of the relevant tire type, wherein the model supplies the tread depth on the basis of the rotation speed of the tire, the velocity of the vehicle and the at least one operating parameter of the tire, selected from the group consisting of a tire pressure, a tire temperature and a tire load of the tire.

Within the context of an aspect of the invention, the term "tire type" denotes information about one or more properties of the relevant tire itself that are thus independent of the operation thereof on the vehicle and in particular independent of burdens affecting the tire during operation and already show up on the tire itself, i.e. the tire as such in the state not fitted to a vehicle.

The tire type can in particular contain or specify information about one or more of the following properties:

tire geometry (e.g. diameter, in particular inside diameter and outside diameter or one of these diameters, and new tire tread depth, tire width, dimension ratios)

area of use (e.g. summer tire, winter tire, all-year tire), tire material qualities (e.g. rather hard, rather soft, in particular also quantitative), type of tread (rather coarse, rather fine, tread pattern specification, etc.), load index, velocity index, etc.

Within the context of an aspect of the invention, the tire type can advantageously also consist of information such as e.g. a manufacturer designation and a model name or a model number and/or coded information such as e.g. "205/55 R18" or contain such information. This is e.g. because the central data processing device may be in a form such that it ascertains the applicable qualitative and/or quantitative properties from such information, e.g. by using/reading an applicable database as part of the data processing device or communicatively connected to the data processing device. Otherwise, although detailed knowledge of the relevant (e.g. physical) properties of a tire type is advantageous within the context of an aspect of the invention, e.g. for forming the optimization data, it is not absolutely necessary.

What is more significant for the tire type of a tire in the new state thereof is that tires of the same kind have the same tire type, whereas different kinds of tires have different tire types.

An example of a coded tire type would be a numerical code allocated once for a specific tire type and therefore uniquely specifying the tire type, e.g. containing a code portion for the manufacturer and a code portion for the model. An example of a universally coded tire type would be e.g. a programming-language-like code, e.g. in XML ("Extensible Markup Language") format or the like, that flexibly defines or specifies, e.g. quantifies, the properties of the relevant tire.

In one embodiment, there is provision for data provided by an electronic wheel unit arranged in the tire to be used for ascertaining the tire type of the tire and/or for ascertaining the mileage of the tire. Electronic wheel units of this kind form e.g. components of a tire pressure monitoring system (TPMS) or of a tire information system (TIS).

In this case, an electronic wheel unit arranged e.g. on an inner side of a tire tread surface can be used in each relevant tire, said electronic wheel unit having the following components:

one or more sensors, selected from the group consisting of an acceleration sensor, including a shock sensor, a deformation sensor, a pressure sensor, a temperature sensor, a memory unit storing the tire type of the relevant tire, a control device for processing sensor signals of the at least one sensor in order to form therefrom data signals to be transmitted to a control device of the vehicle, a radio transmission device for transmitting the data signals in the form of radio signals to the control device of the vehicle.

When an electronic wheel unit of this kind is used, an acceleration sensor or a deformation sensor can e.g. advantageously be used to ascertain the rotation speed of the tire. A pressure sensor can advantageously be used to measure the tire pressure. A temperature sensor can advantageously be used to measure the tire temperature. Applicable measurement results can therefore be transmitted to the control device of the vehicle by means of the radio signals.

Furthermore, in this case, the tire type stored in the memory unit of the electronic wheel unit can also be transmitted to the control device of the vehicle by means of the radio signals.

If the electronic wheel unit is designed to ascertain the tire load (wheel load), then this operating parameter can also be transmitted to the control device of the vehicle by means of the radio signals.

In one development, the mileage of the relevant tire is also stored in the memory unit of the electronic wheel unit and continuously updated, e.g. by means of appropriate evaluation of a sensor signal indicating the tire operation, e.g. the sensor signal of an acceleration sensor. In this case, the mileage stored in the memory unit of the electronic wheel unit can be transmitted to the control device of the vehicle by means of the radio signals.

In another development, the mileage of the tire is stored in a memory unit of the control device of the vehicle and continuously updated therein, e.g. by means of evaluation of the radio signals transmitted by the electronic wheel unit arranged in the relevant tire.

An aspect of the invention relates in particular to the manner of determining the at least one model parameter required for using the model for ascertaining tread depth.

In accordance with an aspect of the invention, the at least one model parameter is determined on the basis of optimization data that the relevant vehicle receives from a central data processing device.

In one embodiment, there is provision for the optimization data themselves already to be or contain the model parameter(s). Alternatively, the optimization data contain information on the basis of which the vehicle or a control device implementing the steps to be performed aboard the vehicle, e.g. a program-controlled control device, can determine these model parameters, possibly using further information ascertained by the vehicle.

In one embodiment, there is provision for the optimization data to be transmitted from the central data processing device to the vehicle via a mobile radio network.

In accordance with an aspect of the invention, the central data processing device forms the optimization data on the basis of adaptation data transmitted from each of a plurality of vehicles to the central data processing device.

In one embodiment, there is provision for the adaptation data to be transmitted from the individual vehicles to the central data processing device via a or the aforementioned mobile radio network.

The vehicles each form the adaptation data on the basis of information ascertained by the relevant vehicle, namely the tire type of the tire, the mileage of the tire, the rotation speed of the tire, the velocity of the vehicle and the at least one operating parameter of the tire, specifically in the case of a typically relatively new tire up to a predetermined maximum mileage.

In one embodiment, there is provision for the adaptation data to contain a plurality of ascertainment value tuples, which are understood in the present case to mean tuples of simultaneously ascertained values of the aforementioned information tire type, tire mileage, tire rotation speed, vehicle velocity, operating parameters. It goes without saying that for a transmission of such a plurality of ascertainment value tuples the tire type can also be specified e.g. only once in a data header, so long as the relevant tire is fitted to the vehicle and the tire type is therefore invariable. The same also applies to a vehicle type if a vehicle type is to be transmitted with the adaptation data.

In this embodiment, the adaptation data are to a certain extent raw data. Alternatively, the vehicle can also process such raw data in order to form the adaptation data therefrom. In that case, the adaptation data are data derived from tire type, tire mileage, tire rotation speed, vehicle velocity, operating parameters.

The adaptation data allow the central data processing device to form the optimization data therefrom. A great advantage of an aspect of the invention is that the central data processing device obtains respective adaptation data from a plurality of vehicles, so that the database, which is therefore large, can advantageously be taken as a basis for forming optimization data, e.g. model parameters, more reliably and more accurately than the individual vehicles or the control devices thereof could each do independently.

In regard to the formation of the adaptation data, it is fundamental that said adaptation data (in the case of a relatively new tire) are formed up to a predetermined maximum mileage. The term "relatively new" should be understood in explanatory fashion in this instance and is defined by the criterion that the mileage of the tire is less than or equal to the predetermined maximum mileage.

In one embodiment of the invention, there is provision for this maximum mileage to be at least 50 km, in particular at least 100 km. On the other hand, it is generally expedient if the maximum mileage is at most 1000 km, in particular at most 500 km.

The advantage of this measure is that the tread depth of a relatively new tire can more or less be assumed to be known for the purposes of an aspect of the invention or can be assessed with a high level of accuracy, so that specifically such tires are particularly suitable for forming the adaptation data with a high level of accuracy on the basis of the ascertainment results relating to tire type, tire mileage, tire rotation speed, vehicle velocity and operating parameters.

For the adaptation data to be formed by the vehicle, there can in particular be provision e.g. for said model to be used and for relatively abrupt variations in a tread depth ascertained thereby to be correlated with simultaneous variations in ascertained variables such as in particular tire rotation speed and/or vehicle velocity and/or the operating parameter(s) (i.e. at least one from tire pressure, tire temperature and tire load).

Since abrupt variations of this kind may typically be based not on actual tread depth variations but rather on a shortcoming of the model, such ascertained correlations can be taken as a basis for optimizing (improving) the model parameter(s) of the model and therefore optimizing the model.

The relevant variables can be measured or ascertained e.g. at least in part by means of an electronic wheel unit and/or may come or be retrievable e.g. from an IT structure of the vehicle, e.g. from a data bus system such as a CAN bus, LIN bus or the like. In particular, the sought model parameter(s) can then be obtained e.g. as the result of a balancing calculation (regression). A balancing calculation of this kind can be performed aboard each of the individual vehicles by means of the control devices thereof. If the vehicles with the adaptation data supply said raw data to the central data processing device, however, a balancing calculation of this kind can also be performed by the central data processing device.

The parallelization made possible according to an aspect of the invention for the ascertainment of tread depth, which involves a plurality of vehicles supplying adaptation data, means that the central data processing device can in particular also advantageously implement processing of the adaptation data by using a neural network and/or by using a self-learning method.

The ascertainment, according to an aspect of the invention, of the tread depth can provide e.g. for the tread depth to be ascertained as an estimated tread depth as
 a new tire tread depth of the ascertained tire type, or
 a new tire tread depth of the ascertained tire type minus a tread depth reduction, wherein the tread depth reduction is assumed to be at least approximately linearly dependent on the ascertained mileage of the tire, and/or is assumed to be dependent on a cumulated ascertained acceleration of the vehicle, e.g. an acceleration value integrated over time.

Alternatively or additionally, for example for the purpose of plausibilization or to provide redundancy or to form a mean value, it is, however, possible, in the case of the relatively new tire, for the ascertainment of the tread depth on this tire e.g. also to provide for the tread depth to be ascertained as in the case of the tire upward of a predetermined minimum mileage, i.e. on the basis of the model.

In the case of the tire upward of a predetermined minimum mileage, the tread depth on this tire is ascertained on the basis of the model, containing the at least one model parameter, of the ascertained tire type using the at least one model parameter determined on the basis of the optimization data received from the central data processing device.

In one embodiment of the invention, there is provision for the predetermined minimum mileage to be prescribed as zero (0 km). In that case, the model-based tread depth ascertainment is therefore performed for every tire, that is to say in particular even for new tires. Within the context of an aspect of the invention, this merely presupposes that the relevant vehicle having the tire has obtained the optimization data required for forming the model parameter(s) from the central data processing device at least once. This in turn is therefore unproblematic because the central data processing device will normally already have formed the optimization data suitable for the tire type, namely on the basis of adaptation data that have been transmitted from other vehicles having tires of the same tire type to the central data processing device.

In another embodiment, there is provision for the predetermined minimum mileage to be at least 50 km, in particular at least 100 km. On the other hand, it is generally expedient if the minimum mileage is at most 1000 km, in particular at most 500 km.

In one embodiment of the invention, there is provision for the maximum mileage and/or the minimum mileage to be prescribed on the basis of the ascertained tire type of the tire.

In one embodiment of the invention, there is provision for the adaptation data transmitted from the plurality of vehicles to the central data processing device to be assigned to one of multiple predetermined classes by means of the central data processing device on the basis of at least the respective tire type. In that case, the optimization data can be formed by means of the central data processing device in particular e.g. on the basis of a common evaluation of the adaptation data transmitted for a relevant class. This advantageously takes account of the circumstance that adaptation data formed on the basis of properties of a tire of one specific tire type have hardly any significance in regard to the properties of a tire of another tire type. The aforementioned classification therefore reduces the effort for forming the optimization data without significant disadvantage. In one development, there is provision for the adaptation data further to be assigned to one of the multiple predetermined classes on the basis of a respective vehicle type. This advantageously takes account of the circumstance that the properties of a tire of one specific tire type can be at least slightly dependent on the properties of the vehicle to which the tire is fitted. Therefore, adaptation data formed on the basis of a combination of tire type and vehicle type normally have advantageously increased significance in regard to the properties of the tire on the relevant vehicle. This development therefore advantageously allows even greater accuracy of the optimization data.

In one embodiment of the invention, there is provision for the adaptation data that are to be transmitted to the central data processing device to be formed as follows:

ascertaining an estimated tread depth of the tire on the basis of the mileage of the tire and the tire type of the tire, ascertaining the tread depth of the tire on the basis of the model of the ascertained tire type, using at least one predetermined standard value, e.g. a starting value for a regression, for the at least one model parameter, adapting the at least one model parameter such that a difference between the estimated tread depth of the tire and the ascertained tread depth of the tire is minimized, e.g. by means of regression, using the at least one adapted model parameter as the adaptation data to be transmitted to the central data processing device.

In particular in this embodiment too, as already mentioned, there may be provision for the optimization data that are to be received from the central data processing device to be or at least contain the at least one adapted or optimized model parameter for the ascertained tire type.

The estimated tread depth (of the relatively new tire) can be ascertained in this instance on the basis of the mileage of the tire and the tire type of the tire as follows:

using a new tire tread depth of the ascertained tire type as the estimated tread depth or using a new tire tread depth of the ascertained tire type minus a tread depth reduction as the estimated tread depth, wherein the tread depth reduction is assumed to be at least approximately linearly dependent on the ascertained mileage of the tire, and/or wherein the tread depth reduction is assumed to be dependent on a cumulated acceleration of the vehicle.

In accordance with a further aspect of the present invention, the object presented at the outset is achieved by a control device for a vehicle for ascertaining a tread depth of a tire of the vehicle, designed to perform a method of the type described in the present case.

In accordance with a further aspect of the present invention, the object presented at the outset is achieved by a system for ascertaining tread depths of tires on a plurality of vehicles, wherein the system has the following:

a control device in each of the vehicles, said control device being designed to perform a method of the type described in the present case, and a central data processing device that is communicatively connected to the vehicles and designed to receive the adaptation data from the vehicles, to form the optimization data on the basis thereof and to transmit the optimization data to the vehicles.

The embodiments and special configurations described for the method in accordance with the first aspect of the invention can accordingly also be provided, individually or in any desired combination, as embodiments or special configurations of the control device according to an aspect of the invention or of the system having such control devices, and vice versa.

BRIEF DESCRIPTION OF THE DRAWINGS

An aspect of the invention is described in more detail below on the basis of exemplary embodiments with reference to the accompanying drawings, in which.

DETAILED DESCRIPTION OF THE PREFERRED EMBODIMENTS

Figure 1:
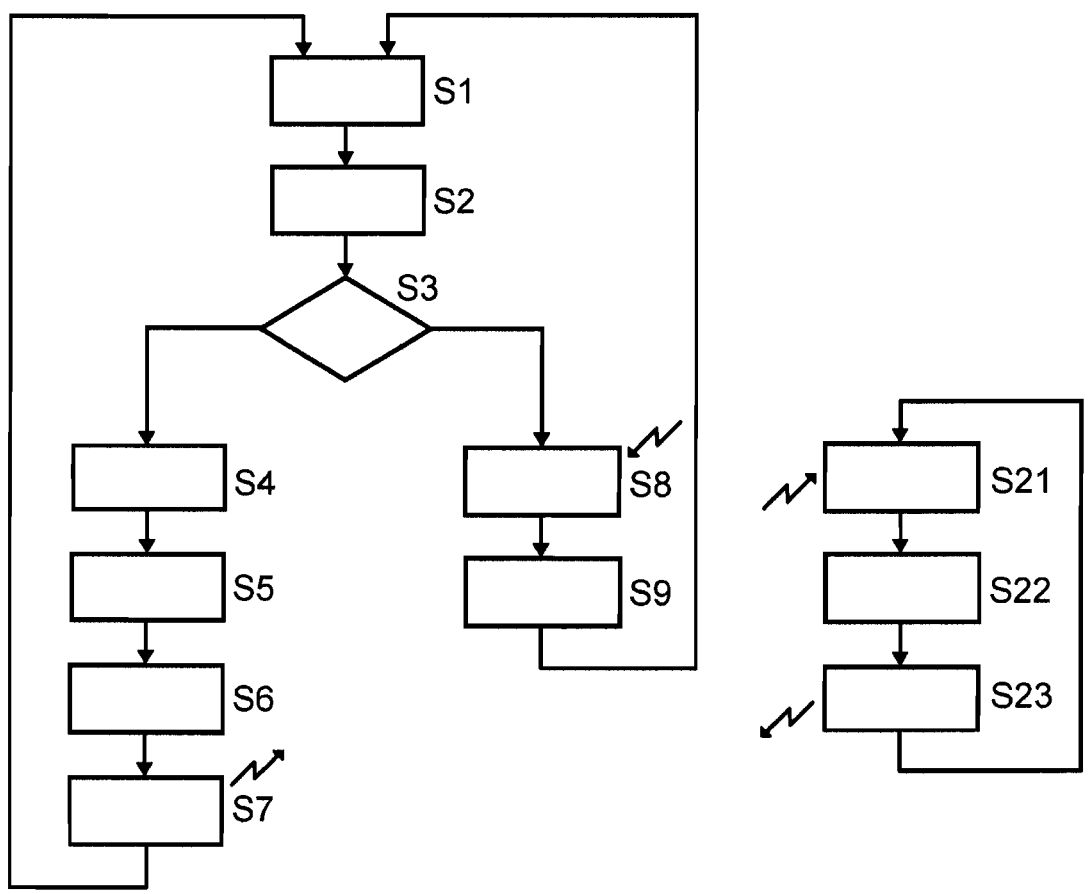
FIG. 1 shows a flowchart for a method for ascertaining a tread depth of a tread of a tire.

FIG. 1 shows, in the left-hand part of the figure, a flowchart for a method for ascertaining a tread depth of a tire on a vehicle having the tire in accordance with one example.

It goes without saying that a method of this kind can be used to ascertain the tread depths of multiple, in particular all, tires of the vehicle. Merely for the sake of simplicity, the method is described in regard to just one tire below.

A step S1 involves ascertaining a tire type of the tire and a mileage of the tire by means of an electronic control device of the vehicle.

For this purpose, the tire type and the mileage can be read e.g. from a memory unit of this control device, in which applicable data are stored, wherein the mileage of the tire is continuously updated, e.g. at prescribed intervals, during the operation of the vehicle.

The tire type can be stored by garage personnel e.g. after a change of tire, either in the control device of the vehicle or in a control device of an electronic wheel unit that is arranged in the relevant tire and, during vehicle operation, from time to time sends radio signals to a radio receiver of the vehicle that is connected to the control device of the vehicle.

The mileage of the tire can also be stored with the value "0 km" e.g. by garage personnel after a new tire is fitted, either in the control device of the vehicle or in the control device of an electronic wheel unit arranged in said tire. To update the mileage, e.g. a sensor signal supplied by an acceleration sensor of the electronic wheel unit can be evaluated as appropriate, if need be by jointly taking into consideration the ascertained tire type, e.g. by means of the control device of the electronic wheel unit. Alternatively or additionally, this can e.g. also involve using the control device of the vehicle to evaluate a signal representative of the vehicle velocity, e.g. a tachometer signal, as appropriate (e.g. in a manner integrated over time) and/or to evaluate a signal representative of the geographical vehicle position, e.g. GPS data, as appropriate.

Like the tire type, the current mileage may also be stored in updated fashion in the control device of the wheel unit and/or in the control device of the vehicle.

A step S2 involves ascertaining a rotation speed of the tire, a velocity of the vehicle and at least one operating parameter selected from the group consisting of a tire pressure, a tire temperature and a tire load of the tire. In the depicted example, all three cited operating parameters are ascertained.

As a departure from this example, this step could also involve other and/or further operating parameters being ascertained, such as e.g. an instantaneous road gradient or an instantaneous vehicle drive mode, e.g. indicating whether a drive torque acts only on specific wheels such as e.g. front wheels or rear wheels, or else on all wheels or all axles.

The rotation speed of the tire can be measured e.g. by an on-vehicle speed sensor arranged on the relevant vehicle wheel. Alternatively or additionally, the aforementioned electronic wheel unit can be used for this purpose, for example by evaluating a sensor signal supplied by an acceleration sensor of the wheel unit.

The velocity of the vehicle can be ascertained e.g. by using a satellite-assisted position-finding system (e.g. GPS), a radar sensor, a lidar sensor, an ultrasonic sensor or an optical camera.

The operating parameters tire pressure, tire temperature and tire load ascertained in this example can be ascertained by means of applicable sensors of the electronic wheel unit, wherein the tire pressure and the tire temperature can be measured directly, whereas the tire load can be ascertained e.g. on the basis of ascertained values of the tire pressure and possibly of the tire temperature and the length of the tire contact surface. The length of the tire contact surface can be ascertained in this instance e.g. by evaluating a sensor signal supplied by an acceleration sensor of the electronic wheel unit.

A step S3 involves checking whether the current mileage of the tire exceeds a maximum mileage predetermined for this tire. The maximum mileage may be e.g. firmly prescribed and/or can be determined on the basis of the ascertained tire type. In the depicted example, the maximum mileage may be prescribed at a value of 200 km, for example.

If the result of the check is that the mileage of the tire has not yet exceeded the maximum mileage, in the present case 200 km, then steps S4 to S7 are performed, as depicted, whereupon the processing returns to step S1 again.

Step S4 involves ascertaining an estimated tread depth of the tire on the basis of the mileage of the tire and the tire type of the tire. In the simplest case, the estimated tread depth assumed therefor can be e.g. a new tire tread depth specified for the ascertained tire type, since the tread depth decreases only very slightly during the first 200 km, on the basis of experience. Alternatively, step S4 can e.g. also involve a tread depth reduction caused by driving being taken into consideration, for example in accordance with a mathematical model, e.g. at least approximately in proportion to the mileage, e.g. using a proportionality factor dependent on the tire type.

Step S5 involves ascertaining the tread depth of the tire on the basis of a mathematical model, containing at least one model parameter, of the ascertained tire type, wherein the model supplies the tread depth on the basis of the ascertained rotation speed of the tire, the ascertained velocity of the vehicle and the ascertained operating parameters of the tire, in the present case tire pressure, tire temperature and tire load, with a predetermined standard value initially being used for the at least one model parameter.

One possible concept behind this model may be e.g. to calculate an inside radius of the tire from the ascertained operating parameters taking into consideration the ascertained tire type and to calculate an outside radius of the tire from the ascertained vehicle velocity and the ascertained tire rotation speed, e.g. after calculating the ratio between vehicle velocity and tire rotation speed, so as then to ascertain the tread depth on the basis of a calculated difference between outside radius and inside radius. This can involve e.g. updating a stored tread depth by virtue of a change of tread depth being assumed to be of the same magnitude as an ascertained change in the difference between outside radius and inside radius.

The model parameter(s) predetermined on the basis of the tire type in this concept can be e.g. correction variables increasing the accuracy of said tread depth ascertainment, as a result of which it is possible for example to take into account the circumstance that in practice a change of tread depth does not correspond exactly to a change in the difference between outside radius and inside radius, since the shape of the tire differs from a circular shape on account of the formation of a tire contact surface. In this respect, it is clear that e.g. jointly taking into consideration operating parameters such as e.g. tire pressure, tire temperature, tire load, etc., allows the accuracy of the model to be improved, the model parameter(s) defining and/or quantifying the manner in which such operating parameters are jointly taken into consideration.

Step S6 involves adapting the at least one model parameter such that a difference between the tread depth of the tire estimated in step S4 and the tread depth of the tire ascertained in step S5 is minimized. This can be accomplished e.g. by using methods of balancing calculation (regression). In this case, the model parameter(s) can be e.g. systematically varied in order to find one or more model parameter(s) for which said difference is at a minimum.

For the reliability or quality of a result of such a regression, it is advantageous if, during the relevant operating phase of the tire in the present case, e.g. up to a mileage of 200 km, the operating conditions of the tire, e.g. tire pressure, tire temperature, tire load, vehicle velocity, etc., change as severely and diversely as possible. This is because if the operating conditions change only imperceptibly during this phase, there is only a limited possibility of using a balancing calculation to determine applicable dependencies of an error in the model-based tread depth ascertainment (difference from the estimated tread depth value), tantamount to less reliable or less accurate ascertainment of the relevant model parameters.

Step S7 involves transmitting adaptation data (symbolized by an arrow in FIG. 1), which, in the present example, contain the adapted model parameter(s) ascertained in step S6 and the ascertained tire type and e.g. additionally a vehicle type, to a central data processing device, e.g. a fixed computing center or e.g. a computer cloud, which is provided as an IT infrastructure communicatively connected to the vehicle via the Internet. A mobile radio network is used for this data transmission in the depicted example.

The central data processing device obtains respective adaptation data of the type explained from a plurality of vehicles and, on the basis thereof, forms optimization data that, in the depicted example, represent or contain optimized model parameters for the respective relevant tire type.

In the depicted example, there is provision for the control device of the vehicle ultimately to use the estimated tread depth as ascertained tread depth until said maximum mileage of 200 km is reached. As a departure therefrom, a tread depth ascertained on the basis of said model could also be used, however, specifically by using one or more model parameters determined on the basis of optimization data received from the central data processing device.

If the result of the check in step S3 is that the relevant tire has already exceeded the maximum mileage, in the present case 200 km, and can therefore no longer be regarded as a relatively new tire, steps S8 and S9 are performed as depicted.

Step S8 involves receiving optimization data (symbolized by an arrow in FIG. 1) for the ascertained tire type from the central data processing device, wherein, as already mentioned, the optimization data in this example directly contain optimized model parameters that can therefore be used by the vehicle directly in the subsequent step S9. In general, it is fundamental that the optimization data allow the vehicle or the control device implementing the method to take the received optimization data as a basis for determining the model parameter(s) for the model. The aforementioned mobile radio network is used for this data transmission in the depicted example.

Step S9 involves ascertaining the tread depth of the tire on the basis of the model, containing at least one model parameter, of the ascertained tire type, wherein the model supplies the tread depth on the basis of the rotation speed of the tire, the velocity of the vehicle and the at least one operating parameter of the tire, using the at least one model parameter, which is determined on the basis of the optimization data received from the central data processing device or is directly inferrable from the optimization data in the example described.

It goes without saying that it is sufficient for an aspect of the invention and in particular for the implementation of the method illustrated in FIG. 1 if step S3 is only repeated from time to time, e.g. at intervals of at least one hour or even at least one day.

And if the result from step S3 means that steps S4 to S7 need to be performed, it goes without saying that in this instance e.g. initially step S4 or steps S4 and S5 or steps S4 to S6 can be performed repeatedly in order to enlarge the database, so as then to perform the remaining step(s) (S5 to S7 or S6 and S7 or S7). Alternatively or additionally, it is e.g. possible for the performance of steps S4 to S7 to involve initially performing steps S4 to S6 repeatedly in order to enlarge the database, so as then to perform step S7 once. In this respect, there may be e.g. provision for step S7 to be performed relatively rarely, e.g. at intervals of at least one day or even at least one week or even more rarely.

And if the result from step S3 means that steps S8 to S9 need to be performed, it goes without saying that in this instance e.g. step S8 can initially be performed once in order to take the data received from the vehicle as a basis for performing step S9 repeatedly, e.g. from time to time, e.g. at intervals of at least 10 minutes or even at least one hour. In this respect, there may be provision for a repetition of step S8 owing to an applicable result from step S3 to be e.g. relatively rare, e.g. at intervals of at least one day or even at least one week or even more rarely.

The right-hand part of FIG. 1 shows a flowchart for the steps taking place in the tread depth ascertainment method on the central data processing device.

A step S21 involves receiving the adaptation data from the aforementioned vehicle and from further vehicles.

A step S22 involves forming the optimization data for said vehicle and for further vehicles.

A step S23 involves transmitting the optimization data to said vehicle and to further vehicles.

In the example from FIG. 1, step S3 taking place on said vehicle provides for a distinction such that the subsequent steps S4 to S7 are performed in the case of a relatively new tire, whereas the subsequent steps S8 and S9 are performed in the opposite case (mileage >200 km).

As a departure from this example, instead of step S3, there could also be provision for checking whether firstly the mileage is less than or equal to said maximum mileage (step S3 as described) and secondly it is additionally checked whether the mileage is at least as high as a predetermined minimum mileage, which may be less than or equal to or greater than the maximum mileage, with steps S4 to S7 being performed in the case of a mileage up to the predetermined maximum mileage and steps S8 and S9 being performed in the case of a mileage of at least the minimum mileage, steps S4 to S7 and steps S8 and S9 therefore possibly being performed in parallel with one another to a certain extent. In other words, it is also possible for adaptation data to be both formed and transmitted (steps S4 to S7), but for the receiving of optimization data and the model-based tread depth ascertainment to take place for the same tire at the same time (steps S8 and S9). For this embodiment too, the above explanations in regard to the performance of step S3 only from time to time and in regard to the relatively rare performance of steps S7 and S8 apply accordingly.

Figure 2:
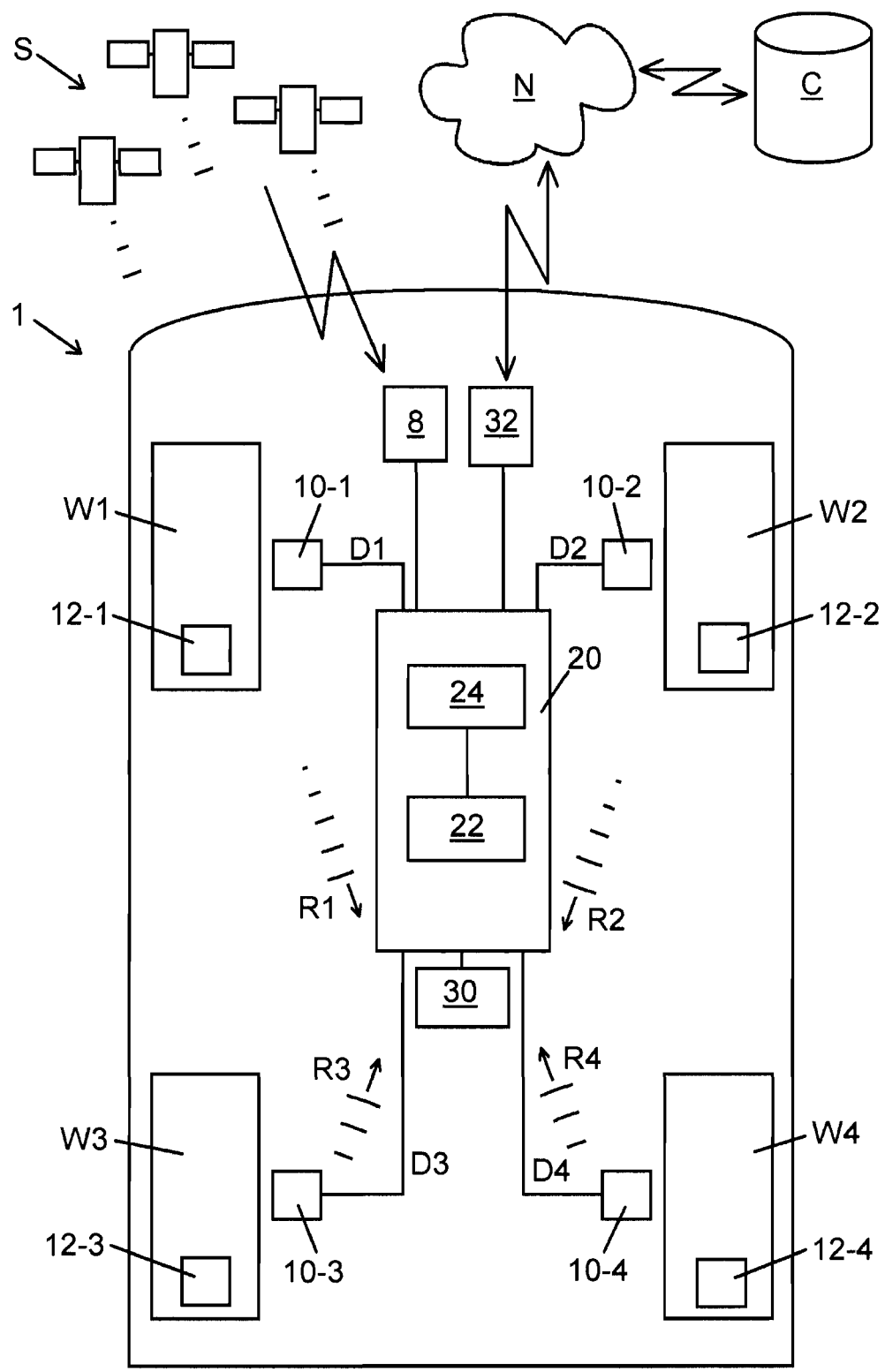
FIG. 2 shows a schematic plan view of a vehicle having a control device by means of which the method of FIG. 1 can be performed.

FIG. 2 shows a vehicle 1 having a control device 20, which, as described below, is designed to perform a method for ascertaining tread depth, e.g. the method depicted in FIG. 1.

In this example, the vehicle 1 has four wheels W1, W2, W3 and W4, which are each formed by a rim having a tire fitted thereto and an electronic wheel unit 12-1, 12-2, 12-3 or 12-4 arranged in the tire.

In the example depicted, a tire pressure monitoring system (TPMS) of the vehicle 1 is formed by means of the electronic wheel units 12-1 to 12-4. Accordingly, the electronic wheel units 12-1 to 12-4 each record at least the tire pressure of the relevant vehicle wheel among the vehicle wheels W1-W4, and the electronic wheel units 12-1 to 12-4 transmit wheel operating data containing at least information about the tire pressure to the control device 20 of the vehicle 1. The electronic wheel units 12-1 to 12-4 are of an identical design and are arranged on an inner side of a tire tread surface of the respective tire in the depicted example.

Figure 3:
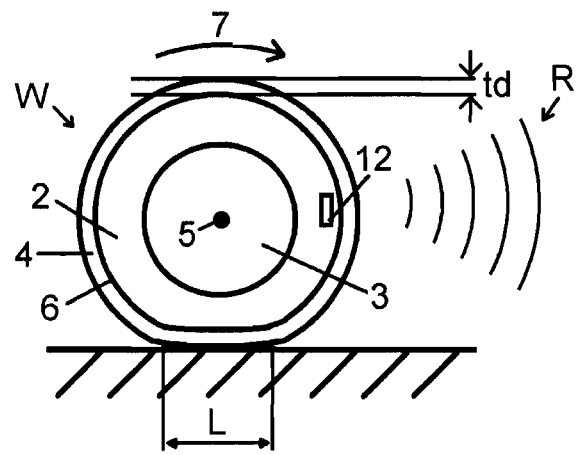
FIG. 3 shows a schematic side view of a vehicle wheel equipped with an electronic wheel unit.

FIG. 3 shows a wheel W of the vehicle 1 (FIG. 2) in exemplary fashion, which may be any of the wheels W1-W4 shown in FIG. 2.

The wheel W is formed by an air-filled tire 2 and a rim 3, wherein the tire 2 has a tread 4, indicated in FIG. 3, having a tread depth td.

During operation of the vehicle 1 having the tire 2, the wheel W rotates about its wheel center 5. An arrow 7 symbolizes this wheel rotation, in which the radially outer end (facing away from the tire) of the tread 4 rolls on the driving surface. The radially inner end of the tread 4, that is to say the tire-side start of the tread 4, is denoted by the reference numeral 6.

A tire load exerted by the vehicle 1 on the wheel W and hence the tire 2 causes a certain deformation of the tire 2 that, as depicted in FIG. 3, involves a tire contact surface being formed between the tire 2 and the driving surface, the length of which tire contact surface is denoted by L in FIG. 3.

The wheel W is furthermore equipped with an electronic wheel unit 12 (cf. electronic wheel units 12-1 to 12-4 in FIG. 2), by means of which wheel operating parameters of the wheel W are able to be recorded and corresponding wheel operating data are able to be transmitted to the control device 20 of the vehicle 1 (FIG. 2) in the form of a periodically transmitted radio signal R (cf. radio signals R1 to R4 in FIG. 2).

Figure 4:
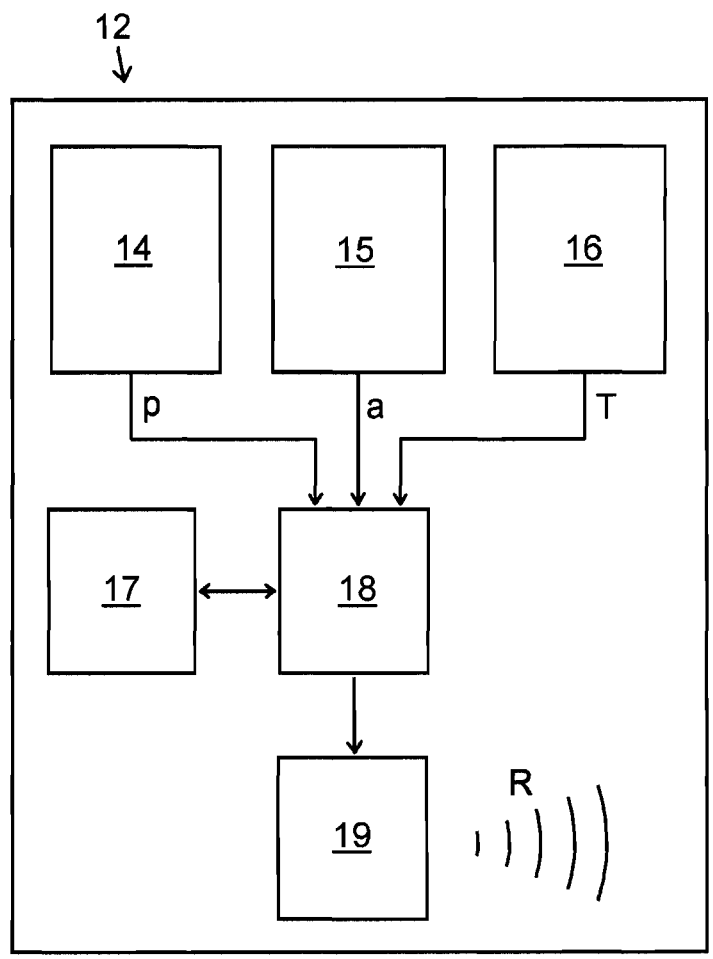
FIG. 4 shows a block diagram of the electronic wheel unit arranged in the wheel of FIG. 2.

FIG. 4 shows the design of an electronic wheel unit 12 of this kind (cf. electronic wheel units 12-1 to 12-4 in FIG. 2) in exemplary fashion. Said electronic wheel unit contains a pressure sensor 14 for measuring the tire pressure and for providing a sensor signal "p" representing the tire pressure, an acceleration sensor 15 for measuring a radial acceleration at the point of attachment of the electronic wheel unit 12 and for providing a sensor signal "a" representing said acceleration, and a temperature sensor 16 for measuring a tire temperature inside the tire 2 and for providing a sensor signal "T" representing said tire temperature.

Said sensor signals p, a, T are fed for processing to a program-controlled computer unit 18, the operation of which is controlled by a program code stored in an associated digital memory unit 17.

The computer unit 18 generates the wheel operating data to be transmitted, which are transmitted to the on-vehicle control device 20 (FIG. 2) in the form of the radio signals R by means of a radio transmitter 19.

The on-vehicle control device 20 (FIG. 2) is connected for this purpose to a radio receiver 30 for receiving the radio signals R (cf. radio signals R1 to R4 in FIG. 2) from all of the electronic wheel units of the vehicle 1.

The measurement of the acceleration and provision of the applicable sensor signal "a" is used in the depicted example to ascertain, by means of an evaluation of the sensor signal characteristic, values of an instantaneous rotation speed and/or rotational position of the relevant wheel W and to incorporate applicable information about this into the wheel operating data (radio signals R).

The radio receiver 30 (FIG. 2) decodes the received data messages and forwards the information contained therein to the control device 20.

The control device 20 has a program-controlled computer unit 22 and an associated memory unit 24, wherein in particular a program code used to operate the computer unit 22 may be stored in the memory unit 24.

The vehicle 1 is equipped with speed sensors 10-1 to 10-4 that are each arranged in a manner fixed to the vehicle and are designed to ascertain values of the instantaneous rotation speed and/or rotational position of the relevant vehicle wheel among the vehicle wheels W1-W4 and to output them to the control device 20 in the form of speed sensor data D1, D2, D3 or D4.

The vehicle 1 is equipped with a satellite-assisted position-finding device in the form of a GPS device 8 that is designed to determine position data relating to the current position of the vehicle 1 by receiving and evaluating radio signals from multiple satellites S. The GPS device 8 can be a component of a navigation system, which is often provided in any case, of the vehicle 1 and transmits the ascertained position data and/or a velocity of the vehicle 1 ascertained therefrom to the control device 20.

The vehicle 1 is furthermore equipped with a mobile radio unit 32 that is communicatively connected to the control device 20 and designed to realize a data communication between the control device 20 and external devices such as e.g. an Internet server. Within the context of an aspect of the invention, the mobile radio unit 32 is used as an interface device for transmitting the adaptation data to the central data processing device and for receiving the optimization data from the central data processing device.

A mobile radio network N depicted in FIG. 2 communicatively connects the vehicle 1 and further vehicles of this kind to a computing center C, which, considered functionally within the context of an aspect of the invention, is an example of the central data processing device.

The computing center C may be formed e.g. by a program-controlled computer unit having an associated memory unit for storing a program code controlling the operation of the computer unit. The memory unit can furthermore be used to at least temporarily store e.g. received adaptation data and/or optimization data that are to be transmitted.

As a departure from the exemplary embodiment of FIG. 2, instead of the computing center C, it is also possible for another suitable IT infrastructure, including a cloud, to be used within the context of an aspect of the invention, e.g. comprising multiple computer devices communicatively interconnected via the Internet that are communicatively coupled to a plurality of vehicles, such as in particular the depicted vehicle 1, via the mobile radio network N.

Additionally, it is possible for the central data processing device to be or to comprise an artificial neural network so as thereby to accomplish the formation of the optimization data on the basis of the adaptation data. In that case, there may in particular be provision e.g. for training and/or machine learning of the neural network for the purpose of improving the quality of the optimization data formed.

The vehicle 1 with the control device 20 in the described interaction with further vehicle components or with software running therein therefore has a means for performing a method for ascertaining the respective tread depth td of the tread 4 (cf. FIG. 3) for any tire 2 of the vehicle 1.

The quality of the tread depth ascertainment for the tires 2 of the vehicle 1 that is accomplished by means of the control device 20 in the vehicle 1 of FIG. 2 is better the more vehicles of this kind are involved in an applicable system, i.e. supply adaptation data to the central data processing device C.

Figure 5:
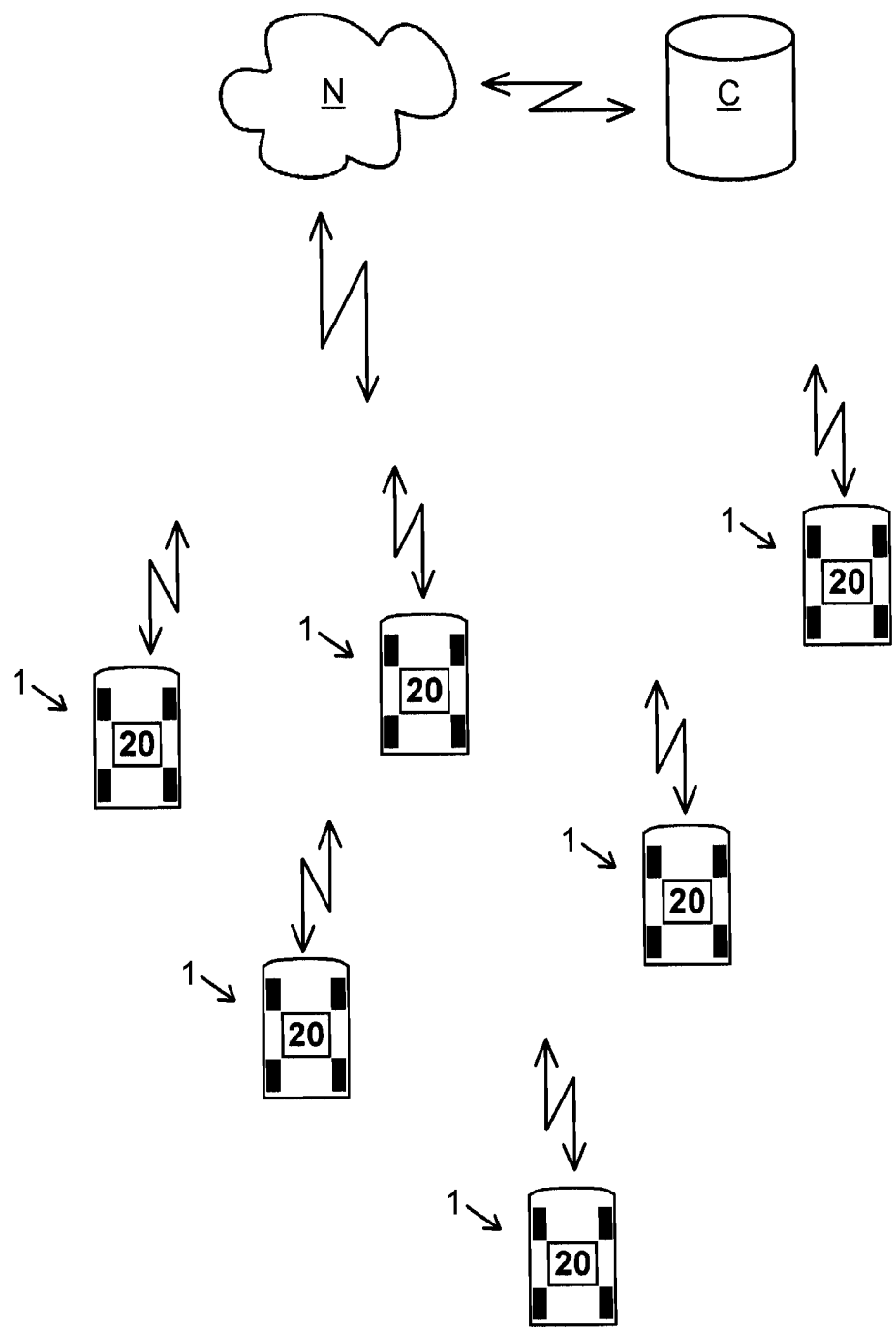
FIG. 5 shows a schematic depiction of a system for ascertaining tread depths for a plurality of vehicles.

FIG. 5 shows such a system for ascertaining tread depths for a plurality of vehicles 1 (typically preferably more than 1000, in particular more than 10,000, vehicles), having, in each of the vehicles 1, a control device 20, which is designed to perform a method of the type described in the present case, and a central data processing device C, which is communicatively connected (cf. arrows in FIG. 5) to the vehicles 1 via a mobile radio network N and is designed to receive the adaptation data from the vehicles 1, to form the optimization data on the basis thereof and to transmit the optimization data to the vehicles 1.

The design and manner of operation of the vehicles 1 can substantially each be provided for as described with reference to FIGS. 1 to 4, the vehicles 1 being able to differ greatly in terms of their tires, however.

The adaptation data transmitted from the plurality of vehicles 1 to the central data processing device C each contain the tire type(s) of the respective tire(s) and a vehicle type, e.g. manufacturer and model codes of the tires and the vehicles. The received adaptation data are assigned to one of multiple predetermined classes by means of the central data processing device C on the basis of at least the respective tire type and preferably additionally on the basis of the vehicle type of the respective vehicle 1. To this end, there is provision for predetermined classes for specific tire/vehicle combinations, preferably taking into consideration a fitting position for the tire on the vehicle, e.g. front wheel or front axle or rear wheel or rear axle.

On the basis of a common evaluation of the adaptation data transmitted for a relevant class, the central data processing device C is used to form associated optimization data and to transmit them to the relevant vehicles 1 (cf. arrows in FIG. 5). These can be e.g. those vehicles 1 that have one or more tires of a tire type specified by the optimization data, or e.g. those vehicles 1 for which the tire type and vehicle type and possibly tire position on the vehicle are consistent with the specification of the optimization data. This transmission can take place actively, but alternatively or additionally also passively when providing these data for retrieval by the relevant vehicles 1.

In summary, tread depth ascertainment for tires 2 on vehicles 1 is proposed that involves a plurality of vehicles 1 transmitting (step S7 in FIG. 1) respective adaptation data to a central data processing device C and said data processing device C forming (step S22 in FIG. 1) optimization data on the basis thereof and transmitting said optimization data to the vehicles. The adaptation data are formed (step S6 in FIG. 1) by the vehicles 1 on the basis of a tire type, a mileage and a rotation speed of the tire 2 and a velocity of the vehicle 1 and at least one operating parameter of the tire 2, selected from tire pressure, tire temperature and tire load, and the optimization data are used by each of the vehicles 1 for ascertaining (step S9 in FIG. 1) the tread depth of a relevant tire 2 on the basis of a model, containing at least one model parameter, of the ascertained tire type, wherein the model supplies the tread depth on the basis of the rotation speed of the tire, the velocity of the vehicle and the at least one operating parameter of the tire using the at least one model parameter, which is determined on the basis of the optimization data received (step S8 in FIG. 1) from the central data processing device C.

LIST OF REFERENCE SIGNS

1 vehicle
W1 to W4 wheels of the vehicle
2 tire
3 rim
L length of the tire contact area
4 tread of the tire
td tread depth
5 wheel center
6 start of the tread
7 wheel rotation
S satellites
8 GPS device
10-1 to 10-4 speed sensors
D1 to D4 speed sensor data
12-1 to 12-4 electronic wheel units
R1 to R4 radio signals
14 pressure sensor
p pressure sensor signal
15 acceleration sensor
a a acceleration sensor signal
16 temperature sensor
T temperature sensor signal
17 memory unit
18 computer unit
19 radio transmitter
20 control device
22 computer unit
24 memory unit
30 radio receiver
32 mobile radio unit
N mobile radio network
C central data processing device

The invention claimed is:

1. A method for ascertaining a tread depth of a tire during operation of a vehicle having the tire, the method comprising:
   ascertaining a tire type of the tire and a mileage of the tire,
   ascertaining a rotation speed of the tire, a velocity of the vehicle and at least one operating parameter selected from the group consisting of a tire pressure, a tire temperature and a tire load of the tire,
   in the case of a tire up to a predetermined maximum mileage:
      transmitting adaptation data, formed on the basis of the tire type of the tire, the mileage of the tire, the rotation speed of the tire, the velocity of the vehicle and the at least one operating parameter of the tire, to a central data processing device,
   in the case of a tire upward of a predetermined minimum mileage:
      receiving optimization data for the ascertained tire type from the central data processing device,
      ascertaining the tread depth of the tire on the basis of a model, containing at least one model parameter, of the ascertained tire type, wherein the model supplies the tread depth on the basis of the rotation speed of the tire, the velocity of the vehicle and the at least one operating parameter of the tire using the at least one model parameter, which is determined on the basis of the optimization data received from the central data processing device,
   wherein a plurality of vehicles transmit respective adaptation data to the central data processing device, and the central data processing device forms the optimization data on the basis thereof.

2. The method as claimed in claim 1, wherein data provided by an electronic wheel unit arranged in the tire are used for ascertaining the tire type of the tire and/or for ascertaining the mileage of the tire.

3. The method as claimed in claim 2, wherein the predetermined maximum mileage and the predetermined minimum mileage are each at least 50 km and/or at most 1000 km.

4. The method as claimed in claim 2, wherein the predetermined maximum mileage and the predetermined minimum mileage are each at least 100 km and/or at most 500 km.

5. The method as claimed in claim 1, wherein the predetermined maximum mileage and the predetermined minimum mileage are each at least 50 km, and/or at most 1000 km.

6. The method as claimed in claim 1, wherein the predetermined maximum mileage and/or the predetermined minimum mileage is prescribed on the basis of the ascertained tire type of the tire.

7. The method as claimed in claim 1, wherein the adaptation data transmitted from the plurality of vehicles to the central data processing device are assigned to one of multiple predetermined classes by means of the central data processing device on the basis of at least the respective tire type, and wherein the optimization data are formed by means of the central data processing device on the basis of a common evaluation of the adaptation data transmitted for a relevant class.

8. The method as claimed in claim 1,
   wherein the adaptation data that are to be transmitted to the central data processing device are formed as follows:

ascertaining an estimated tread depth of the tire on the basis of the mileage of the tire and the tire type of the tire, ascertaining the tread depth of the tire on the basis of the model of the ascertained tire type, using at least one predetermined standard value for the at least one model parameter, adapting the at least one model parameter such that a difference between the estimated tread depth of the tire and the ascertained tread depth of the tire is minimized, using the at least one adapted model parameter as the adaptation data to be transmitted to the central data processing device, wherein the optimization data that are to be received from the central data processing device are the at least one adapted model parameter for the ascertained tire type.

9. The method as claimed in claim 8, wherein the estimated tread depth is ascertained on the basis of the mileage of the tire and the tire type of the tire as follows:

using a new tire tread depth of the ascertained tire type as the estimated tread depth or using a new tire tread depth of the ascertained tire type minus a tread depth reduction as the estimated tread depth, wherein the tread depth reduction is assumed to be at least approximately linearly dependent on the ascertained mileage of the tire, and/or wherein the tread depth reduction is assumed to be dependent on a cumulated acceleration of the vehicle.

10. A control device for a vehicle for ascertaining a tread depth of a tire of the vehicle, designed to perform a method as claimed in claim 1.

11. A system for ascertaining tread depths of tires on a plurality of vehicles, wherein the system comprises:

a control device in each of the vehicles, said control device being designed to perform a method as claimed in claim 1, and a central data processing device that is communicatively connected to the vehicles and designed to receive the adaptation data from the vehicles, to form the optimization data on the basis thereof and to transmit the optimization data to the vehicles.

12. The method as claimed in claim 1, wherein the predetermined maximum mileage and the predetermined minimum mileage are each at least 100 km and/or at most 500 km.

* * * * *